H. HINKLEY.
Car Truck.
No. 3,981. Patented Apr. 1, 1845.
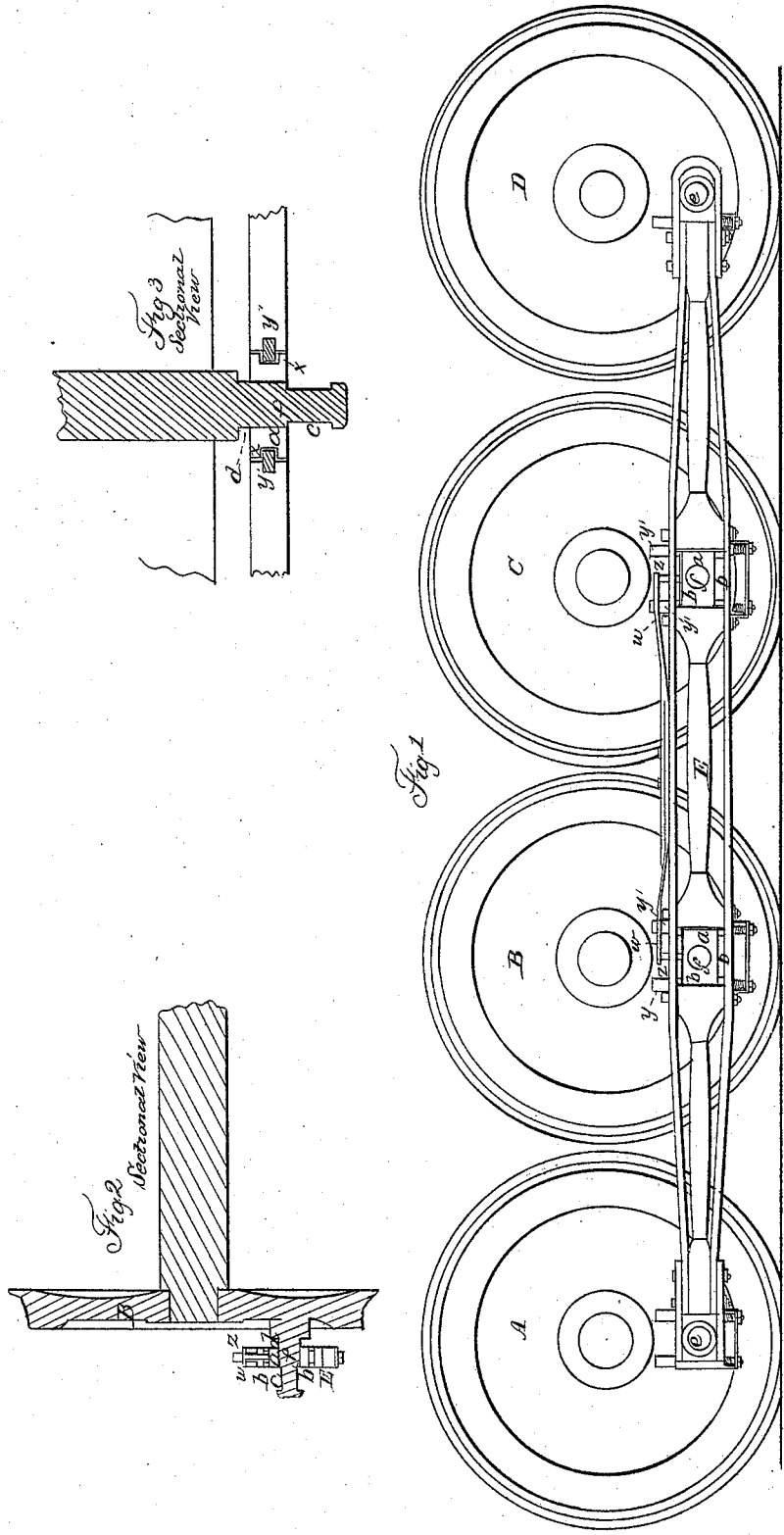

UNITED STATES PATENT OFFICE.

HOLMES HINKLEY, OF BOSTON, MASSACHUSETTS.

METHOD OF CONNECTING WHEELS OF LOCOMOTIVE STEAM-ENGINES TO RENDER THEM ALL DRIVING-WHEELS.

Specification of Letters Patent No. 3,981, dated April 1, 1845.

*To all whom it may concern:*

Be it known that I, HOLMES HINKLEY, of Boston, in the county of Suffolk and State of Massachusetts, have invented an improvement in mechanism for connecting three or more sets of wheels of locomotive steam-engines in order to convert the whole into drivers, of the construction and operation of which the following description and accompanying drawings taken together constitute a full and exact specification.

Figure 1, represents a side elevation of four adjacent wheels of a locomotive, having eight wheels. Fig. 2 is a vertical and central section, taken through one of the crank pins of one of the two inner wheels.

A, B, C, D, (Fig. 1) denote the wheels on one side of an eight wheel engine. E is one connecting rod, extending from the outside of the first wheel (A,) by those of the wheels B, C, to that of the last one (D,). By this rod, all the wheels are connected together in such manner as to transfer the power of the driving cranks of the driving shafts, to all the wheels, in order to increase the adhesive surface on the railways. Heretofore, it has been thought impracticable (in the case where three or more sets of wheels were to be used, and when the undulations and curves of a railway were considered), to connect all the wheels by one rod, so as to operate advantageously. Therefore, two or more connecting rods have been used, and they have been so arranged upon the wheels, that the second worked outside of the first, and the third outside of the first two, and so on.

Each end of my rod, which is one of the wheels A, or D,—is to be fitted with straps and boxes, in the usual manner, so as to receive and operate upon, a crank pin, *e*, projecting from the outside or vertical surface of the wheel. Each of the other wheels, has a similar crank pin (*f*,) applied in, and projecting from its vertical side—the said crank pins, passing through, and running in boxes, *a, a*, sustained in the connecting rod. The said boxes *a, a*, are to be so arranged as to be capable of moving up and down in a vertical direction, in order that they may rise and fall, in accordance with the undulations of the track, and not strain the rod. The vertical ends of the said boxes, have vertical grooves formed in them (as seen at X, X, Fig. 3, which is a horizontal section of one of the boxes and parts adjacent thereto) each of which receive and slide upon, one of two keys *y, y*, which is passed downward through and confined in the rod—the said keys serving to keep the boxes in place in the rod. There should be a space *b*, above and below each box, and of sufficient depth, to allow of the requisite vertical movement of each box. The said spaces, in their depths may correspond with those of the boxes of the housings which support the driving wheel shafts. Each of the boxes has a pin Z inserted in its upper side, which passes through the connecting rod—and rests against the underside of the ends of a spring *w*, secured upon the top of the rod, as seen in the drawings.

To accommodate the lateral motion of the wheels—arising from the curvature of the track or from any other cause—the intermediate crank pins, or those inserted in the wheels B, and C, should be lengthened between, their collars *c, d*, (see Fig. 3) that is to say, the distance between the collars *c* and *d*, should be greater than the width of the bearing surface of the pin in the box—and the said crank pins should take such a position, in their respective boxes, when the engine rests upon a straight railway track— that the inner adjacent sides of the collars, *c, d*, shall be at equal distances from the adjacent sides of the box, that is, the box should be midway between the collars— which mode of constructing and arranging the boxes in the connecting rod, and crank pins of the wheels, will allow the wheels to accommodate themselves to a curved or undulating track, without any injurious strain upon the connecting rod, either laterally or vertically.

I claim—

The making the boxes (*a, a*), to slide vertically in the connecting rods, in combination with, extending or lengthening the crank pins of the wheels B, C, beyond the said boxes—so as to slide through them in the direction of their axes—as set forth— the whole being for the purpose of converting all of several wheels of the engine into drivers—as described.

HOLMES HINKLEY.

Witnesses:
R. H. EDDY,
GEORGE H. BAILEY.